United States Patent [19]

Hironori et al.

[11] Patent Number: 5,259,607
[45] Date of Patent: Nov. 9, 1993

[54] AUTOMATIC PAPER FEEDING DEVICE

[75] Inventors: Tanaka Hironori, Yamatokouriyama; Kawatsuri Masaya, Nara; Matsumoto Masakazu, Yamatokuriyama, all of Japan

[73] Assignee: Sharp Kabushiki Kaisha, Osaka, Japan

[21] Appl. No.: 891,567

[22] Filed: May 29, 1992

[30] Foreign Application Priority Data

| May 31, 1991 | [JP] | Japan | 3-129416 |
| May 31, 1991 | [JP] | Japan | 3-129417 |
| May 31, 1991 | [JP] | Japan | 3-129418 |
| May 31, 1991 | [JP] | Japan | 3-129419 |

[51] Int. Cl.$^5$ .............................. B65H 5/00
[52] U.S. Cl. .................... 271/10; 271/116; 271/118
[58] Field of Search ........... 271/10, 114, 116, 117, 271/118, 270

[56] References Cited

U.S. PATENT DOCUMENTS

| 3,966,198 | 6/1976 | Komada et al. | 271/265 |
| 3,990,694 | 11/1976 | Mason et al. | 271/35 |
| 4,005,257 | 1/1977 | Krallinger et al. | 358/256 |
| 4,556,209 | 12/1985 | Tsubo | 271/10 |
| 4,866,531 | 9/1989 | Kobori et al. | |
| 4,927,130 | 5/1990 | Tanaka et al. | 271/10 |
| 4,953,037 | 8/1990 | Ito et al. | |
| 5,085,240 | 2/1992 | Sata | 271/118 X |
| 5,090,675 | 2/1992 | Nagai et al. | 271/118 X |
| 5,116,038 | 5/1992 | Kim | 271/116 X |

FOREIGN PATENT DOCUMENTS

| 0369299 | 5/1990 | European Pat. Off. | |
| 1906873 | 7/1979 | Fed. Rep. of Germany | 271/117 |
| 0102738 | 6/1984 | Japan | 271/10 |
| 0071437 | 4/1985 | Japan | 271/10 |
| 0165236 | 7/1988 | Japan | 271/117 |
| 0150639 | 6/1989 | Japan | 271/116 |

Primary Examiner—H. Grant Skaggs
Assistant Examiner—Carol Lynn Druzbick
Attorney, Agent, or Firm—David G. Conlin; George W. Neuner

[57] ABSTRACT

An automatic paper feeding device includes a pivotable member around which a sending out roller and a driving shaft are pivotally supported. Provided between a transmission gear of driving shaft and the transmitted gear of sending out roller is an intermediate gear. One of intermediate gear and transmitted gear has a rotational load, and sending out roller is elevated toward an insert guide plate disposed at the upper portion by the force of this rotational load. Original paper installed between inside guide plate and sending out roller are sequentially separated and sent into a machine from its bottom end. According to the structure, separate paper feeding is ensured, the number of parts necessary is reduced, thereby achieving cost reduction as a result.

15 Claims, 8 Drawing Sheets

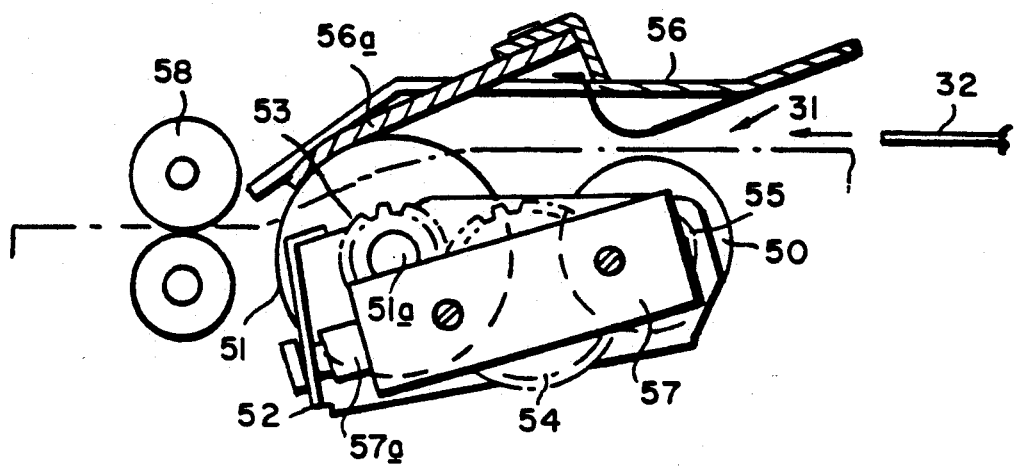
FIG. IIA PRIOR ART
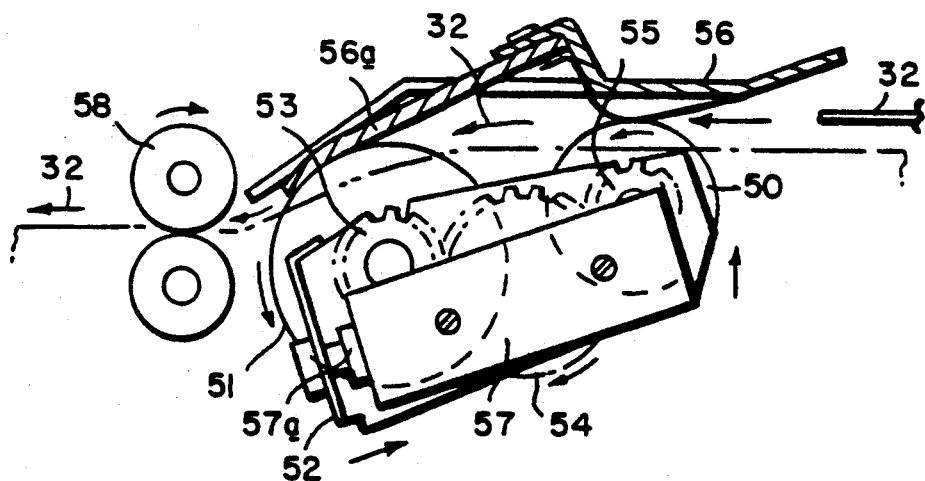
FIG. IIB PRIOR ART

AUTOMATIC PAPER FEEDING DEVICE

BACKGROUND OF THE INVENTION

1. Field of the Invention

The present invention relates generally to an automatic paper feeding device for use in, for example, a facsimile machine, and more specifically, to the up and down movement mechanism of a sending out roller used for sending paper, an automatic paper feeding mechanism for ensuring separate paper feeding, etc.

2. Description of the Background Art

Conventionally, the following mechanism is known as an automatic paper feeding mechanism for feeding original paper in, for example, a facsimile machine. More specifically, the mechanism, as shown in FIGS. 10 and 11, includes a sending out roller 50, and a paper feeding roller 51 provided in the machine at a further inner part than this sending out roller 50.

These rollers 50 and 51 are pivotably supported on a pivotable member of channel shape (hereinafter referred to pivotable member) which is disposed below an insert guide plate 56, and rotatably coupled by gears 53, 54, and 55. An entrance 31 for inserting original paper 32 is formed between insert guide plate 56 and sending out roller 50.

The circumferential surface of paper feeding roller 51 abuts upon a separation rubber plate 56a provided at the lower surface of insert guide plate 56. One end of the supporting shaft 51a of paper feeding roller 51 extends from pivotable member 52 and coupled to a driving source (not shown) provided on the side of the machine body.

Such coupling of the supporting shaft 51a of paper feeding roller 51 to the machine body side allows the pivotal movement of pivotable member 52 around supporting shaft 51a, and a DC solenoid 57 is provided as means for pivoting the angle. DC solenoid 57 is attached to the side of the machine body, and the tip end of its expansion/contraction rod 57a is connected to pivotable member 52. Therefore, when an operation signal is supplied to DC solenoid 57, expansion/contraction rod 57a contracts to pivotable member 52 and lifts sending out roller 50.

In the figures, the reference numeral 58 designates a conveying roller for sending original paper 32 sent into the machine by paper feeding roller 51 further inside the machine.

According to such an automatic paper feeding mechanism, a plurality of sheets of original paper 32 set at entrance 31 are separated from the lower end side by driving rotating of sending out roller 50 lifted (elevated) by DC solenoid 57, and sent to the side of paper feeding roller 51 on a one-by-one sheet basis. The sheets of original paper 32 are sent further into the machine by driving paper feeding roller 51 to rotate.

When sending of all sheets of a sheaf of original paper 32 is completed, DC solenoid 57 expands expansion/contraction rod 57a to lower pivotable member 52, and opens entrance 31 so that the next sheaf of original paper 32 can be inserted.

In an automatic paper feeding mechanism, sheets of original paper 32 should be fed at regular intervals. Otherwise the machine can not separately identify sheets of original paper 32. Therefore, in a conventional automatic paper feeding mechanism, for example, a method is employed by which a sheet of original paper 32 at the bottom layer is separated by the striking out of sending out roller 50 and sheets of original paper 32 are sorted out by separation rubber plate 56a provided at the upper part of paper feeding roller 51. It is however difficult to successfully achieve separate feeding of paper according to such a method.

This is because due to the structure of DC solenoid 57, it is difficult to change the amount of contraction and the position to which sending out roller 50 is elevated is constant. However, sending out roller 50 is naturally elevated to different positions between the state where a large number of sheets of original paper 32 are stacked thereon and that where a small number of sheets of original paper 32 are stacked thereon. As a result, the conventional automatic paper feeding mechanism is encountered with difference in interlayer pressing force by DC solenoid 57 between a sheaf of a large number of sheets of original paper 32 and a sheaf of a small number of sheets of original paper 32. Particularly, in the case of the original paper 32 with a large number of sheets piled thereon, pressing force between the sheets of original paper 32 increases, rendering the friction force between the sheets of original paper 32 larger than the striking force of sending out roller 50, resulting in original paper 32 being too heavy to be sent.

Furthermore, DC solenoid 57 is sensitive to temperature because of its structure, its magnetic force changes in response to temperature change, and especially degrades with temperature rise. Construction of an automatic paper feeding mechanism using DC solenoid 57 with such a property makes it difficult to ensure separate feeding of paper due to its unstable sending of original paper 32.

Furthermore, DC solenoid 57 is a relatively expensive part for a striking noise it creates when the magnetic force takes effect and requires a driving circuit (not shown) for its driving, resulting in increase in the number of parts and costs.

SUMMARY OF THE INVENTION

It is an object of the present invention to provide an automatic paper feeding device capable of ensuring separate paper feeding.

Another object of the present invention is to provide an automatic paper feeding device directed to cost reduction by reducing the number of parts necessary.

In order to achieve the above-stated objects, an automatic paper feeding device according to the present invention includes a pivotable member pivotable around a pivoting axis, and the pivotable member is provided with a sending out roller pivotably supported in parallel to the pivoting axis and in the same axis as a transmitted gear. Further provided is a driving shaft pivotably supported around the pivotable member, coaxial to the above-stated pivoting axis and provided with a transmission gear in the same axis, for driving the sending out roller to rotate. An intermediate gear exist between the transmission gear and transmitted gear, and an insert guide plate is provided at the upper part of the sending out roller. The intermediate gear or transmitted gear has a prescribed rotational load.

According to this structure, with the intermediate gear or transmitted gear having the rotational load, a rotational driving transmitted from the driving shaft via the intermediate gear to the transmitted gear generates the moment of rotation around the driving shaft, and causes the pivotable member to pivot. Thus, the sending out roller rotates and rises until it comes into abutment upon the insert guide plate. As a result, a sheet of paper set on the sending out roller is held between the insert guide plate and the sending out roller to be sent into the machine by the rotational movement of the sending out roller.

Elevation of the sending out roller is made by the rotational load applied to the intermediate gear or the transmitted gear, the position to which the sending out roller is elevated changes depending upon the thickness or weight of paper. Therefore, no more force than necessary is applied on the paper in its thicknesswise direction.

Also in a preferred embodiment of the present invention, a plurality of edges are provided at the outer circumference of the sending out roller, and these edges are disposed equidistantly from the axis of rotation of the sending out roller.

These edges intensifies force for striking out paper, and the striking out operation of the paper is thus ensured.

In a preferred embodiment of an automatic paper feeding device according to the present invention, the driving shaft is formed of a main driving shaft and a sub driving shaft, and spring coupling portion is interposed therebetween, which is coupled only when rotational driving acts in one rotating direction upon the driving shaft, and released from the coupling when rotational driving acts in the opposite direction.

When a torque in the opposite direction is applied to the spring coupling portion with the elevated sending out roller being in abutment upon the insert guide plate, the coupling state between the main driving shaft and sub driving shaft is released, and rotational driving is no longer transmitted to the intermediate gear or the transmitted gear. Then, the moment of rotation around the driving shaft disappears, the pivotable member pivots by its own weight, and the sending out roller descends.

In a preferred embodiment of an automatic paper feeding device according to the present invention, a spring coupling portion includes a coil spring disposed between a main driving shaft and a sub driving shaft which are coaxially provided, and the coil spring is formed of a spring of resin.

According to this structure, being formed of the coil spring of resin, the spring coupling portion does not have to be supplied with oil, and generation of noise is prevented.

An automatic paper feeding device according to the present invention includes a structure in which among transmitted gear and an intermediate gear a rotatable gear having a rotational load which is provided at a prescribed angle to the axis of rotation free from load.

According to this structure, since the gear having the rotational load has prescribed play in its rotating direction, the intermediate gear or the transmitted gear rotates reversely along the main driving shaft by the amount of the play, before the pivotable member descends by the release of the coupling of the spring coupling portion. More specifically, until the coupling of the spring coupling portion is released, the pivotable member pivots for the amount of the play of rotation beforehand and descends, and the descending of the sending out roller is therefore more smoothly conducted.

An automatic paper feeding device according to the present invention includes a paper feeding roller for sending paper entered into the machine by paper sending out roller further inside the machine, a driving shaft is provided coaxially to and through the paper feeding roller, and the paper feeding roller is coupled with the driving shaft so that the roller can be driven to rotate by the driving shaft.

An automatic paper feeding device according to the present invention includes a device further including conveying means for conveying paper sent by the paper feeding roller.

A spring coupling portion in an automatic paper feeding device according to the present invention in a preferred embodiment includes a coil spring, and first, second, and third sleeves fit in the coil spring. The main driving shaft and sub driving shaft are coupled coaxially to the first sleeve and the second sleeve, respectively, and the paper feeding roller is coupled in the same axis as and to rotate integrally with the third sleeve. The rotating speed of the paper feeding roller is set lower than the feeding speed of the conveying means.

According to the structure, with the speed by the conveying means being set lower than the rotating speed of the paper feeding roller, the paper feeding roller starts rotating normally at a high speed following feeding moving by the feeding means due to the friction between paper and itself. Then, the third sleeve coupled to the paper feeding roller races in the normal direction, adding a torque in the opposite direction to the spring coupling portion the spring coupling portion releases the coupling of the main driving shaft and sub driving shaft as a result, and the rotational driving is no longer transmitted to the intermediate gear or transmitted gear. Thus, the moment of rotation around the driving shaft disappears, the pivotable member pivots by its own weight, and the sending out roller stops rotating as it descends.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11A is a partially sectional side view showing the sending out roller 50 of the conventional automatic paper feeding device shown in FIG. 10 in its descended state; and FIG. 11B is a partially sectional side view showing the sending out roller 50 of the device in abutment upon an insert guide plate 56 sending out original paper 32.

DESCRIPTION OF THE PREFERRED EMBODIMENTS

Figure 1:
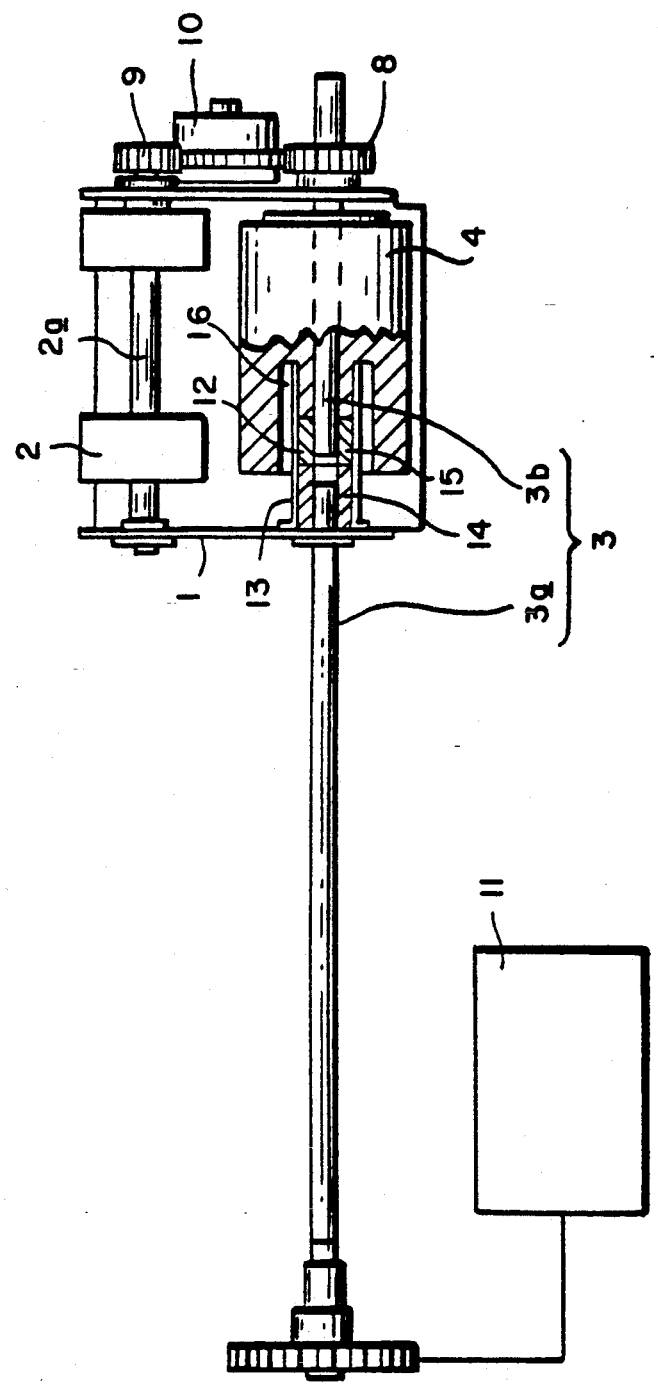
FIG. 1 is a plan view showing a structure of an automatic paper feeding device in accordance with one embodiment of the present invention.
Figure 2A:
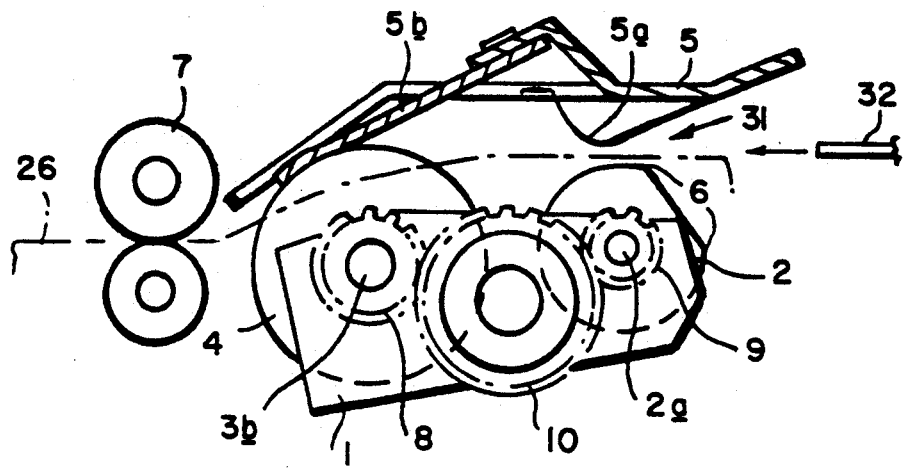
FIG. 2A is a partially sectional side view showing the sending out roller 2 of the automatic paper feeding device shown in FIG. 1 in its descended state.
Figure 2B:
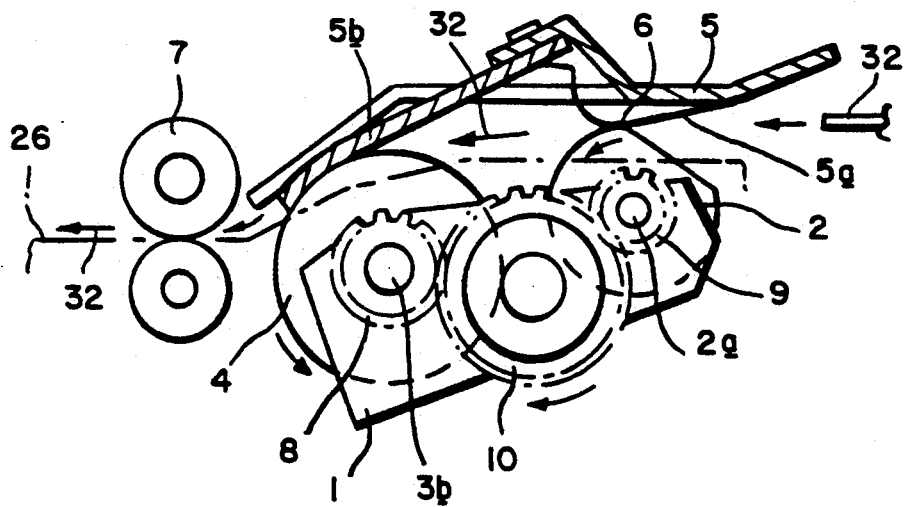
FIG. 2B is a partially sectional side view showing the sending out roller 2 of the same device in abutment upon an insert guide plate 5 sending out original paper 32.
Figure 3:
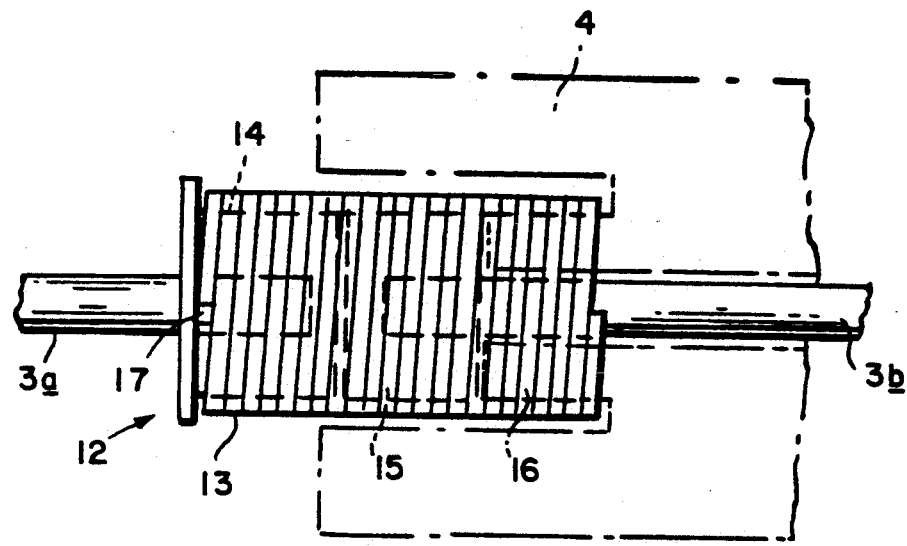
FIG. 3 is an enlarged view showing the spring coupling portion 12 of the automatic paper feeding device shown in FIG. 1.

A detailed description of the present invention in conjunction with embodiments shown in the drawings follows. FIG. 1 is a plan view showing one embodiment of the present invention, and FIGS. 2A and 2B are the side views thereof.

The mechanism of this embodiment includes a pivotable member 1, a sending out roller 2, a driving shaft 3, and a paper feeding roller 4. Pivotable member 1 is disposed below an insert guide plate 5. Sending out roller 2 and driving shaft 3 are disposed both intersecting the direction of inserting original paper, with the driving shaft 3 being disposed further inside from sending out roller 2. Driving shaft 3 and the supporting shaft 2a of sending out roller 2 are supported pivotally on pivotable member 1.

A pressure spring plate 5a is attached below the insert end of insert guide plate 5. Pressure spring plate 5a is disposed in the upper part of the sending out roller. An entrance 31 for inserting original paper 32 is formed between pressure spring plate 5a and sending out roller 2.

The roller body of sending out roller 2 has a D-shape when seen in an axis direction, with two edges 6 being formed on its circumferential surface. Paper feeding roller 4 is disposed through and coaxially to driving shaft 3 and coupled to driving shaft 3 by a structure which will be later described. The circumferential surface of paper feeding roller 4 slightly abuts upon separation rubber plate 5b attached to the lower surface of insert guide plate 5. A conveying roller 7 is provided as conveying means for conveying original paper 32 in the machine at a further inner part of the machine than paper feeding roller 4.

Driving shaft 3 is provided with a transmission gear 8 at its one end, sending out roller 2 is provided with a transmitted gear 9 at its supporting shaft 2a, and an intermediate gear 10 is interposed between these gears 8 and 9. Intermediate gear 10 is formed of a torque limit gear having a load in the direction of normal rotation, and is attached to a pivot roller 1 by a screw 10a.

The other end of driving shaft 3 is coupled to a driving source 11 (formed of an electric motor) extended from pivotable member 1 and provided at the body of the machine. Driving source 11 can rotate both normally and reversely. Thus coupling driving shaft 3 to the machine body allows the pivotal movement of pivotable member 1 around driving shaft 3. A stopper (not shown) is provided at the position at which the machine body contacts pivotable member 1 so that pivotable member 1 will not pivot downwardly from the position shown in FIG. 2B.

Driving shaft 3 is formed of a main driving shaft 3a coupled to driving source 11, and a sub driving shaft 3b including a transmission gear 8.

Figure 4:
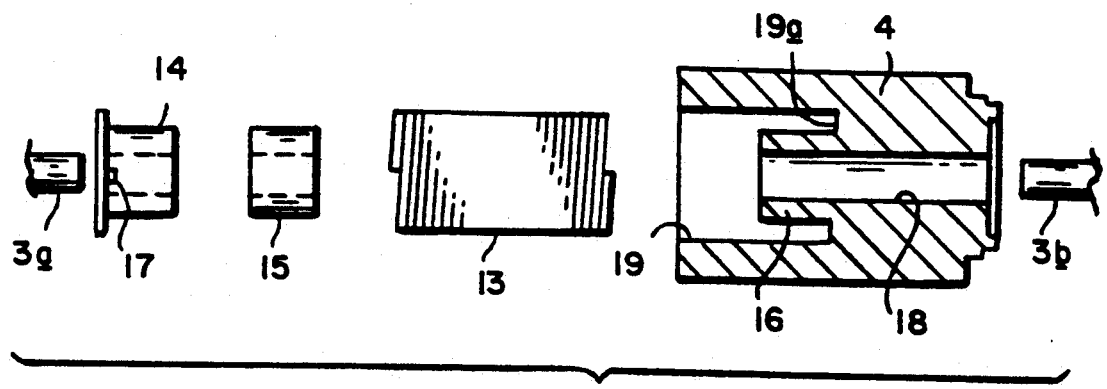
FIG. 4 is a partially sectional side view showing the spring coupling portion exploded.
Figure 5:
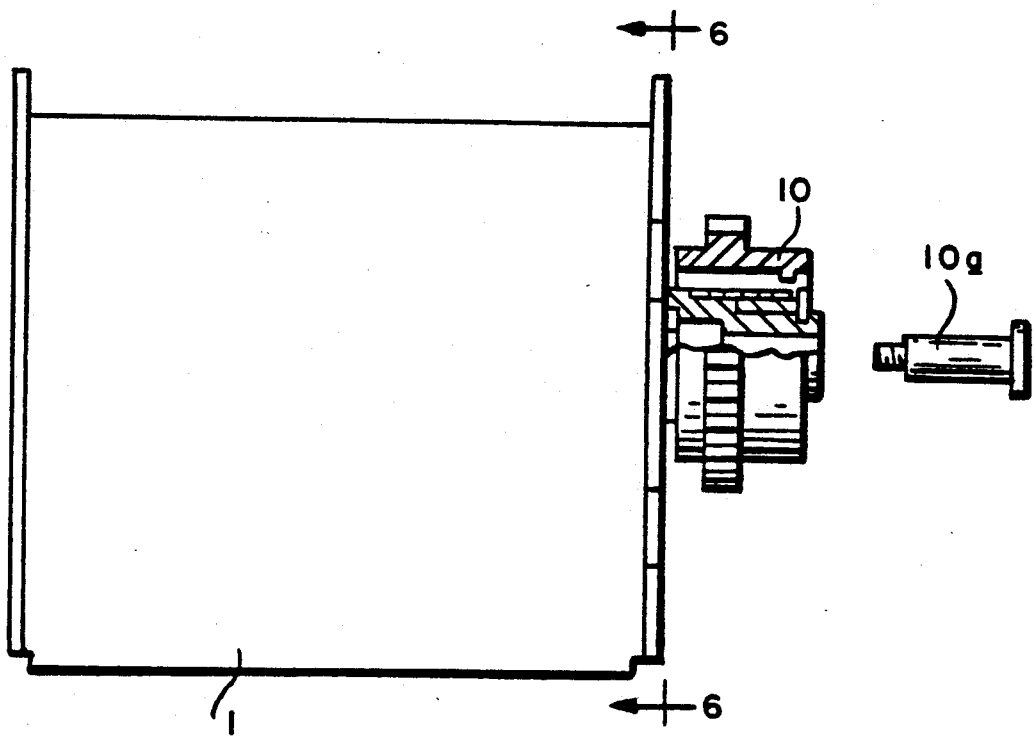
FIG. 5 is a partially cut away plan view showing the attachment of the intermediate gear 10 of the automatic paper feeding device shown in FIG. 1.

Shafts 3a and 3b are abutted and coaxially disposed with a spring coupling portion 12 interposed therebetween. Spring coupling portion 12 is formed of a coil spring 13, and first, second, and third sleeves 14, 15, and 16 as shown in FIG. 4.

Coil spring 13 is formed of a spring of resin, and disposed between main driving shaft 3a and sub driving shaft 3b. Being formed of the coil spring of resin, coil spring 13 does not require oil supply, and the occurrence of abnormal noise when it expands/contacts is restrained as much as possible.

First sleeve 14 is integrally coupled to the butted end of main driving shaft 3a in its rotation, and accommodated inside one end of coil spring 13. Provided on the circumferential surface of first sleeve 14 is a protrusion 17 which rotates and engages to coil spring 13.

Second sleeve 15 is rotatably and integrally coupled to the butted end of sub driving shaft 3b, and is fitted into the central portion of coil spring 13.

Third sleeve 16 is integrally formed with the inner portion of the roller of the above-described paper feeding roller 4. More specifically, paper feeding roller 4 is provided with a through hole 18 through which sub driving shaft 3b passes, and a hollow space 19 along the axial direction at its inner portion. The inner end 19a of hollow space 19 rises outwardly in a sleeve shape, and this sleeve shape rise forms third sleeve 16. Being accommodated in paper feeding roller 4, third sleeve 16 has its size reduced in the axial line direction. Third sleeve 16 is fitted inside the other end of coil spring 13. Thus, paper feeding roller 4 is provided through and coaxially to driving shaft 3 and also coupled to driving shaft 3.

In this mechanism, the circumferential speed of the roller surface of conveying roller 7 is set higher than that of the roller surface of paper feeding roller 4. In other words paper feeding by conveying roller 7 is faster than paper feeding conducted by paper feeding roller 4. More specifically, conveying roller 7 and driving shaft 3 are supplied with rotational driving from the same driving source 11, and the circumferential speed of conveying roller 7 is made faster than that of paper feeding roller 4 by changing the gear ratios of gears interposed between driving source 11 and these rollers.

Figure 6:
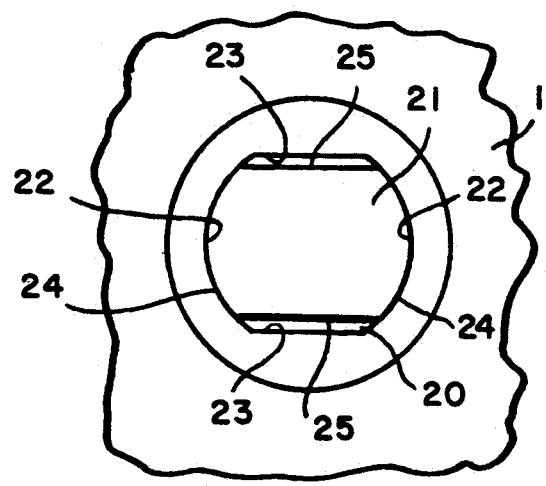
FIG. 6 is a cross-sectional view along line 6—6 in FIG. 5 illustrating the attachment of the intermediate gear 10.
Figure 7:
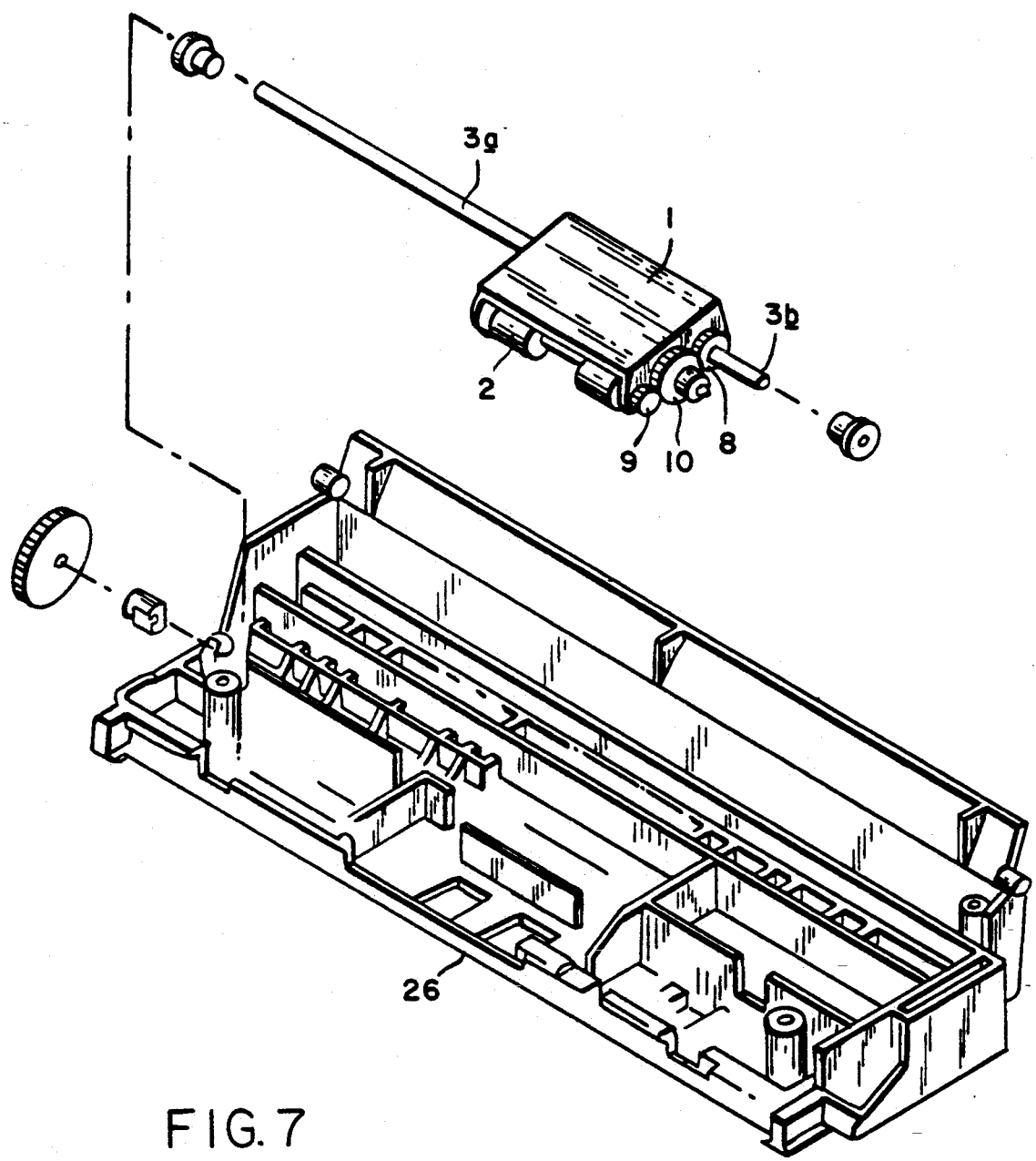
FIG. 7 is an exploded perspective view showing the attachment of the sending out roller 2 of the device seen from its back side.

Intermediate gear 10 is provided with a fixed rotation looseness to its rotation center. More specifically, as shown in FIG. 6, hole 20 for engagement is provided on the side of intermediate gear 10, while a protrusion 21 for engagement is formed at the center of rotation in other words on the side of pivotable member 1. Hole 20 is formed of opposing parallel ends 22, 22 disposed in parallel with each other, and opposing circumferential ends 23, 23 disposed perpendicularly to these opposing parallel ends. Protrusion 21 is formed of opposing circumferential surfaces 24, 24 having the same diameter as opposing circumferential end 23, and opposing parallel surfaces 25, 25 disposed slightly closer to each other as compared to opposing parallel ends 22. Therefore, mating hole 20 and protrusion 21 allows the attachment of intermediate gear 10 with a rotation looseness of a prescribed angle on the side of the center of rotation in other words on the side of pivotable member 1.

In FIGS. 2A and 2B, the reference numeral 26 designates a machine housing disposed under insert guide plate 5. The top surface of machine housing 26 and insert guide plate 5 guides original paper 32. Formed on the top surface of machine housing 26 is an opening through which sending out roller 2 and paper feeding roller 4 are inserted.

A description of sending out operation of the original paper 32 by the automatic paper feeding mechanism as described above follows. A sheaf of original paper 32 formed of stack of a plurality of sheets are set at entrance 31. The sheets of original paper 32 are sensed by a sensor which is not shown, and then driving source 11 is driven to rotate normally. This normal rotational driving is transmitted to main driving shaft 3a and further via spring coupling part 12 to sub driving shaft 3b and paper feeding roller 4.

This transmission of rotation is conducted as follows. When main driving shaft 3a rotates in the normal rotation direction (anticlockwise rotation direction in FIGS. 2A and 2B), first sleeve 14 is also driven to rotate in the normal direction, causing twisting of coil spring 13 in its torsional direction between second and third sleeves 15 and 16. Therefore, coil spring 13 is tightened to couple integrally rotatably first sleeve 14 to second and third sleeves 15 and 16. The rotational driving of main driving shaft 3a is transmitted to sub driving shaft 3b and paper feeding roller 4, and sub driving shaft 3b and paper feeding roller 4 rotates in the normal rotation direction (the anticlockwise direction in FIGS. 2A and 2B).

Then normal rotational driving transmitted to sub driving shaft 3b is transmitted via transmission gear 8 further to intermediate gear 10. Intermediate gear 10 has a rotational load in the normal direction (the clockwise rotation direction in FIGS. 2A and 2B), transmits the rotation driving force transmitted to intermediate gear 10 to gear 9, and generates the moment of rotation around driving shaft 3.

Pivotable member 1 pivots around driving shaft 3 by the moment of rotation (the anticlockwise direction in FIGS. 2A and 2B), and sending out roller 2 is lifted, making the original paper 32 abutt upon pressure spring plate 5a. At the same time, the sending out roller 2 lifting original paper 32 rotates in the anti clockwise direction in the figure, the bottom layer of original paper 32 is separated from the sheaf of the originals by the rotation of sending out roller 2 and stricken out to the side of paper feeding roller 4.

The bottom layer original paper 32 stricken out by sending out roller 2 enters between paper feeding roller 4 and separation rubber plate 5b, and further enters between a couple of conveying rollers 7 by the rotation of paper feeding roller 4. With conveying rollers 7 and paper feeding roller 4 being disposed close to each other, the bottom layer of original paper 32 is conveyed to the paper feeding roller 4 and conveying rollers 7 at a time. However, as described above, the conveying speed by conveying rollers 7 is set faster than that of paper feeding roller 4. Therefore, original paper 32 is conveyed at the conveying speed by conveying rollers 7, and paper feeding roller 4 follows in operation at the speed of conveying rollers 7 due to frictions created between original paper 32 and itself.

Paper feeding roller 4 follows the operation of conveying rollers 7 at the conveying speed of the rollers 7, in other words paper feeding roller 4 rotates normally faster than driving shaft 3. This high speed following operation drives third sleeve 16 to race in the normal rotation direction, thereby twisting coil spring 13 in the anti-torsional direction. Coil spring 13 twisted in the anti-torsional direction is relaxed and releases the coupling of main driving shaft 3a and sub driving shaft 3b as a result. Then, the rotational driving of sub driving shaft 3b is no longer transmitted, and sending out roller 2 stops rotating. At that time, the moment of rotation created by the rotational load of intermediate gear 10 disappears, pivotable member 1 pivots in the clockwise rotation direction by its own weight, and sending out roller 2 descends. More specifically, when original paper 32 enters between conveying rollers 7, sending out roller 2 stops rotating to descend, and interrupts sending of original paper 32.

When a sheet of original paper 32 passes paper feeding roller 4 in a further preceded stage of original paper conveyance by conveying rollers 7, the high speed following operation of paper feeding roller 4 is completed. When the high speed following operation is complete, coil spring 13 is released from the twist in the anti-torsional direction, and once again couples main driving shaft 3a and sub driving shaft 3b. Then, once again pivotable member 1 pivots, thereby elevating sending out roller 2, and sending out roller 2 starts rotating, thus resuming sending of a sheet of original paper 32.

When the sending of original paper 32 is resumed, the sheets of original paper passing paper feeding roller 4 has already reached the inner part of the machine, and sheets of original paper 32 are sent at regular intervals.

According to the above-stated operation, when sending of all sheets of original paper 32 is completed, pivotable member 1 stops at the position to which it is elevated and prevents the next sheet of original paper 32 from being inserted. This is because when the final sheet of original paper 32 passes paper feeding roller 4 in a further preceded stage of conveyance of original paper 32, coupling of spring coupling portion 12 is resumed, whereby sending out roller 2 is elevated. In this state, a completion of sending of original paper 32 is sensed by a sending completion sensor which is not shown, and even if transmission of the driving force to main driving shaft 3a is stopped based on the detection, the moment of rotation by intermediate gear 10 does not disappear, and sending out roller 2 stops at the position to which it is elevated.

When a completion of sending of original paper 32 is detected by the sending completion sensor, driving source 11 is driven to rotate reversely for a fixed amount. Then, first sleeve 14 coupled to main driving shaft 3a races in the reverse rotation direction, twisting coil spring 13 in the anti-torsional direction, whereby coil spring 13 is relaxed to release the coupling of main driving shaft 3a and sub driving shaft 3b. Then, sub driving shaft 3b is freed, the moment of rotation by intermediate gear 10 disappears, then pivotable member 1 pivots by its own weight, sending out roller 2 descends, and entrance 31 is opened as a result.

The lowering of sending out roller 2 after the sending of the final sheet of original paper 32 must be ensured for insertion of the next sheaf of original paper 32. Protrusion 17 is therefore provided to first sleeve as described above. Engagement protrusion 17 engages the end of coil spring 13 when first sleeve 14 races due to a reverse rotational driving of driving source 11. Coil spring 13 is surely relaxed accordingly. Furthermore, in order to smoothly conduct the lowering of sending out roller 2 at the time of the completion of sending of the final sheet of original paper 32, intermediate gear 10 is provided with looseness of a prescribed angle in the direction of rotation as described above. This is because the torque limit gear forming intermediate gear 10 does not rotate in the reverse rotation direction, pivotable member 1 does not pivot until the coupling of spring coupling portion 12 is completely released by the reverse driving, and sending out roller 2 is unlikely to descend smoothly. However, with the rotation looseness being provided to intermediate gear 10, intermediate gear 10 is rotated reversely in accordance with main driving shaft 3a for the amount of rotation looseness before pivotable member 1 is lowered by the release of the coupling of spring coupling portion 12. More specifically, pivotable member 1 pivots and descends for the amount of the rotation looseness before the coupling of spring coupling portion 12 is released. The descending of sending out roller 2 is thus smoothly conducted.

The amount of original paper 32 sent into a facsimile machine is not always constant, whose thickness therefore varies. Therefore, the position to which sending out roller 2 is elevated is preferably variable. According to the mechanism of the present invention, sending out roller 2 is lifted by the rotation load provided to intermediate gear 10, and its position of elevation changes depending upon the thickness or weight of the sheaf of original paper 32. Therefore, it is possible to elevate sending out roller at a constant force regardless of the thickness of the original. There is no possibility that original paper 32 is too heavy to send due to increase of frictions between the sheets of original paper 32.

Furthermore, axially viewed the roller of sending out roller 2 has a D shape and two edges 6 are provided. Two edges 6 increases force for striking out a sheet of original paper 32, and separation paper feeding is ensured.

Figure 8:
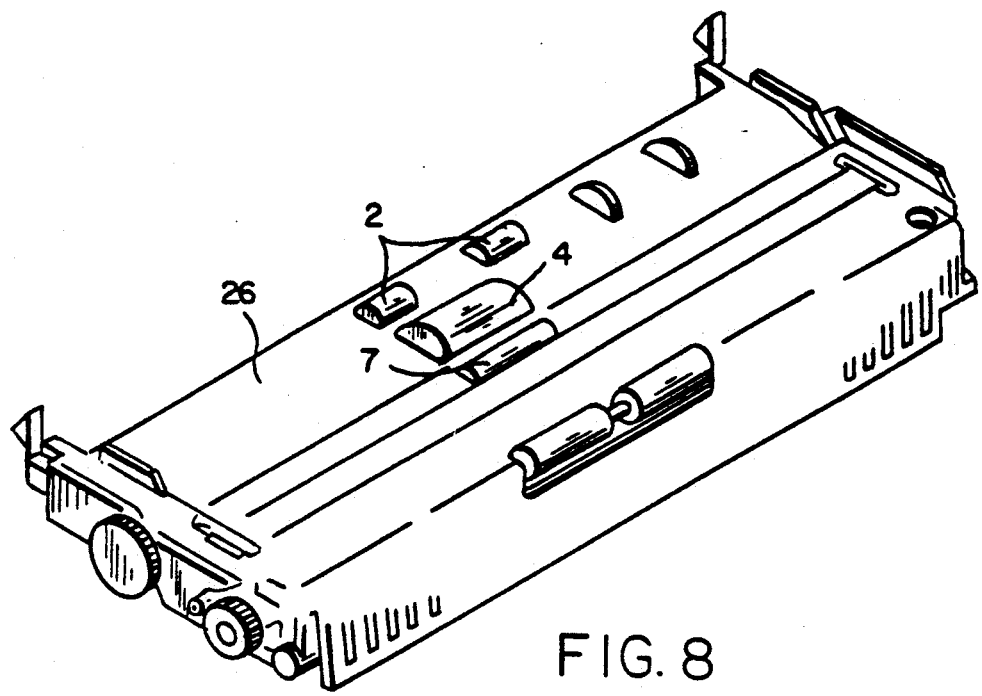
FIG. 8 is a perspective view showing the attached sending out roller 2 of the device.
Figure 9:
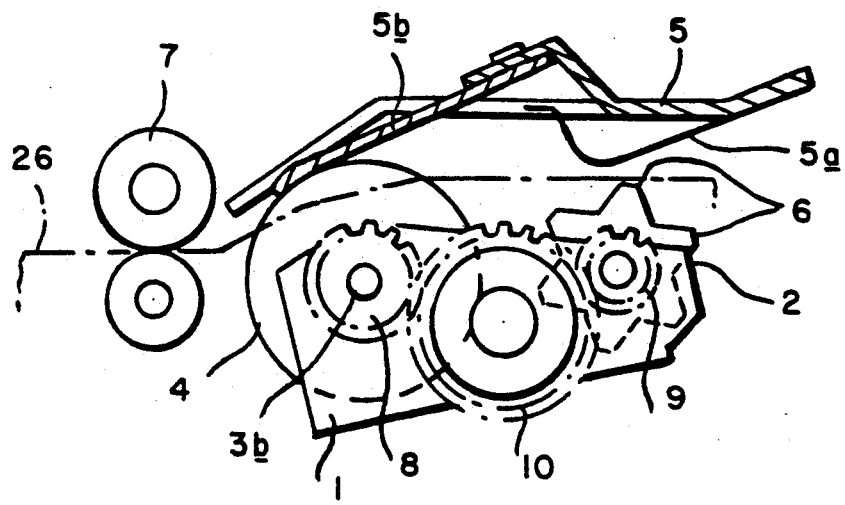
FIG. 9 is a partially sectional side view showing another embodiment of the sending out roller 2.
Figure 10:
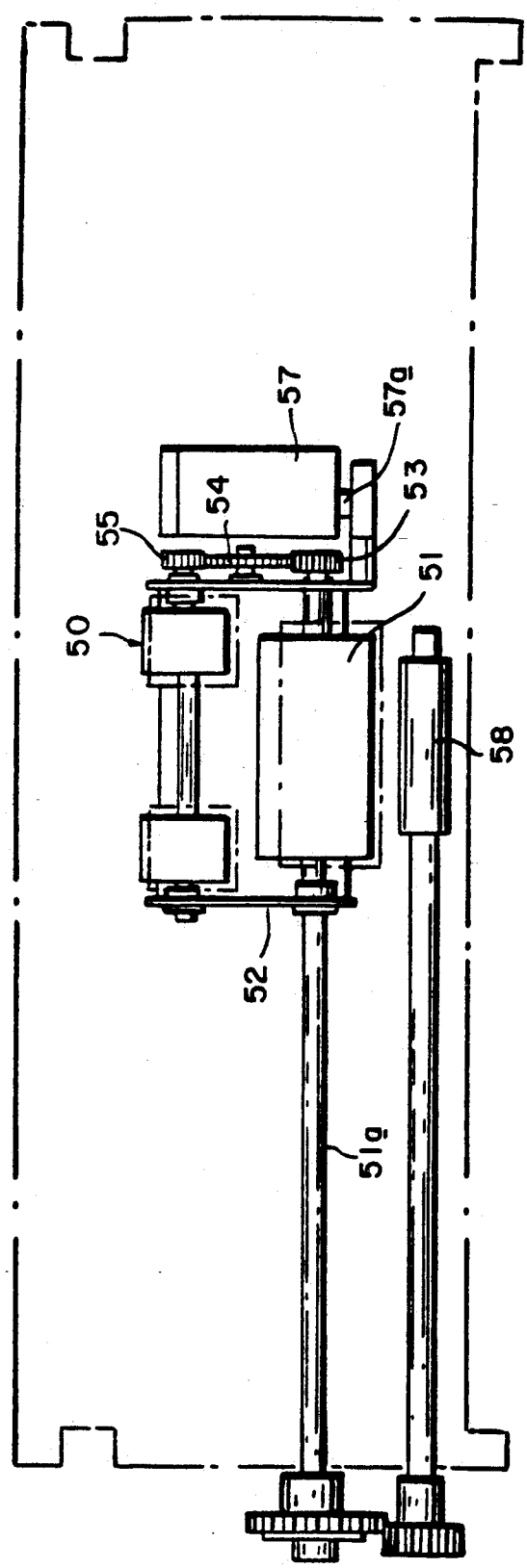
FIG. 10 is a plan view showing a structure of a conventional automatic paper feeding device.

In the present embodiment, although the D-shaped sending out roller 2 is employed, the invention is not limited to this, a star-shape as shown in FIG. 8 may be employed. In this case, with a number of edges 6 being formed in the circumferential direction, the frequency of striking a sheet of original paper 32 increases, thereby facilitating separate paper feeding. Also, though not shown, the same effects can be provided if sending out roller 2 is formed of a roller of a polygonal shape.

As described above, according to the present invention, during a period of sending a preceding sheet of paper, the sending out roller is stopped and sending of the next sheet can be interrupted. Therefore, sending of sheets of paper can be conducted at sufficient intervals, separated paper feeding is ensured, and deficiency, attributable to serial sending of original paper can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic paper feeding device, comprising:
    a pivotable member pivotable around a pivoting axis;
    a sending out roller supported pivotally in parallel with said pivoting axis and provided with a coaxial transmitted gear;
    a driving shaft supported to pivot with said pivotable member and coaxially to said pivoting axis, and provided with a transmission gear in the same axis, for driving said sending out roller to rotate;
    an intermediate gear interposed between said transmission gear and said transmitted gear; and
    an insert guide plate disposed at an upper portion of said sending out roller, wherein
    at least one of said intermediate gear and said transmitted gear having a prescribed rotational load.

2. An automatic paper feeding device as recited in claim 1, wherein said sending out roller has a plurality of edges in its outer circumference, and said edges are disposed equidistantly from the center of the rotation of said sending out roller.

3. An automatic paper feeding device as recited in claim 1, wherein said driving shaft includes a main driving shaft and a sub driving shaft, and a spring coupling portion is interposed between said main driving shaft and said sub driving shaft, the coupling of which works only when a rotational driving force in a normal rotation direction acts and is released when rotational driving force in its opposite direction acts.

4. An automatic paper feeding device as recited in claim 3, wherein said main driving shaft and said sub driving shaft are coaxially disposed, and said spring coupling portion includes a coil spring disposed between said main driving shaft and said sub driving shaft.

5. An automatic paper feeding device as recited in claim 4, wherein said coil spring is formed of a spring of resin.

6. An automatic paper feeding device as recited in claim 4, wherein said main driving shaft is provided with a protrusion for engaging the end of said coil spring so as to stop rotating relatively only to one rotating direction.

7. An automatic paper feeding device as recited in claim 3, wherein a driving source capable of rotating normally and reversely is coupled to said main driving shaft.

8. An automatic paper feeding device as recited in claim 3, wherein the one of said transmitted gear and said intermediate gear having a prescribed rotational load is allowed of free rotation without any rotation load within a prescribed angle around the center of rotation.

9. An automatic paper feeding device as recited in claim 3, further comprising:
    a paper feeding roller for taking the sheet of paper send by said sending out roller, and sending it forward wherein
    said driving shaft is provided coaxially to said paper feeding roller and through said paper sending roller, said paper feeding roller is coupled to said driving shaft so as to be driven to rotate by said driving shaft.

10. An automatic paper feeding device as recited in claim 9, further comprising conveying means for conveying the sheet of paper sent by said paper feeding roller.

11. An automatic paper feeding device as recited in claim 9, wherein said spring coupling portion includes a coil spring, and first, second, and third sleeves fitted into the coil spring, and
    said driving shaft and said sub driving shaft are coaxially coupled to said first sleeve and said second sleeve, respectively, and said paper feeding roller is coupled to said third sleeve so as to rotate coaxially and in one united body with said third sleeve.

12. An automatic paper feeding device as recited in claim 11, a hollow space is formed inside said paper feeding roller, and said third sleeve is disposed in the hollow space.

13. An automatic paper feeding device as recited in claim 11, the circumferential speed of said paper feeding roller is set lower than the conveying speed of said conveying means.

14. An automatic paper feeding device, comprising:
a paper path;
a sending out roller disposed under an insert guide plate;
a paper feeding roller disposed further along the paper path as compared to said sending out roller;
conveying means for conveying a sheet of paper sent into the device by said sending out roller and said paper feeding roller; and
a driving shaft, wherein
said driving shaft includes a main driving shaft and a sub driving shaft disposed coaxially to each other,
a spring coupling portion existing between said main driving shaft and said sub driving shaft,
said spring coupling portion includes a coil spring, and first, second third sleeves fitted into the coil spring,
said main driving shaft and said sub driving shaft are coupled to said first sleeve and said second sleeve, respectively,
said driving shaft is disposed coaxially to and passing through said paper feeding roller, and is coupled to said third sleeve, and
the circumferential speed of said paper feeding roller is set lower then the conveying speed of said conveying means.

15. An automatic paper feeding device, comprising:
a pivotable member pivotable around a pivoting axis;
a sending out roller pivotally supported in parallel to said pivoting axis and provided with a coaxial transmitted gear;
a driving shaft supported to pivot with said pivotable member and coaxially to said pivoting axis, and including a transmission gear in the same axis for driving said sending out roller to rotate;
an intermediate gear existing between said transmission gear and said transmitted gear,
an insert guide plate disposed above said sending out roller;
a paper feeding roller for sending a sheet of paper sent into the device by said sending out roller further inside the device; and
conveying means for conveying the sheet of paper sent by said paper feeding roller, wherein
at least one of said intermediate gear and said transmitted gear has a prescribed rotational load,
said driving shaft includes a main driving shaft and a sub driving shaft, a spring coupling portion existing between said main driving shaft and said sub driving shaft, and coupling is released when rotational driving force acts upon in the opposite direction,
said main driving shaft and said sub driving shaft are disposed coaxially,
said spring coupling portion includes a coil spring disposed between said main driving shaft and said sub driving shaft,
said driving shaft is disposed coaxially to and through said paper feeding roller, said paper feeding roller is coupled to said driving shaft so as to be driven to rotate by said driving shaft,
said spring coupling portion includes first, second, and third sleeves fitted into the coil spring, and said main driving shaft and said sub driving shaft are coaxially coupled to said first sleeve and said second sleeve, respectively, and said paper feeding roller is coupled coaxially to said third sleeve and rotates integrally to said third sleeve.

* * * * *